US008653933B2

(12) United States Patent
Hitchin

(10) Patent No.: US 8,653,933 B2
(45) Date of Patent: Feb. 18, 2014

(54) SYSTEM OF DEVICES COMPRISING A PLURALITY OF SENSOR DEVICES COMMUNICATING WITH A CENTRAL GATEWAY DEVICE

(75) Inventor: Mark L. Hitchin, Crawley (GB)

(73) Assignee: Koninklijke Philips N.V., Eindhoven (NL)

( * ) Notice: Subject to any disclaimer, the term of this patent is extended or adjusted under 35 U.S.C. 154(b) by 1757 days.

(21) Appl. No.: 11/718,622

(22) PCT Filed: Nov. 8, 2005

(86) PCT No.: PCT/IB2005/053659
§ 371 (c)(1),
(2), (4) Date: May 4, 2007

(87) PCT Pub. No.: WO2006/051480
PCT Pub. Date: May 18, 2006

(65) Prior Publication Data
US 2009/0072962 A1 Mar. 19, 2009

(30) Foreign Application Priority Data
Nov. 10, 2004 (EP) ....................................... 0424762

(51) Int. Cl.
*G05B 23/02* (2006.01)

(52) U.S. Cl.
USPC ........................ 340/3.1; 340/539.22; 702/188

(58) Field of Classification Search
USPC ............ 340/539.13, 539.11, 539.1, 531, 500, 340/525, 447, 933, 539.22; 714/35; 702/188
See application file for complete search history.

(56) References Cited

U.S. PATENT DOCUMENTS 5,061,917 A * 10/1991 Higgs et al. .............. 340/539.22
2002/0183979 A1* 12/2002 Wildman ...................... 702/188
2003/0096629 A1* 5/2003 Elliott et al. .................. 455/522

* cited by examiner

*Primary Examiner* — Brian Zimmerman
*Assistant Examiner* — Kevin Lau

(57) ABSTRACT

A system of devices comprises a plurality of sensor devices and a central gateway device. Each sensor device comprises communicating means for communicating with the central gateway device, storage means storing a unique identifier, and display means displaying a location identifier. The central gateway device comprises communicating means for communicating with the plurality of sensor devices, and storage means storing the unique identifiers of the plurality of sensor devices.

4 Claims, 4 Drawing Sheets

Figure 1:
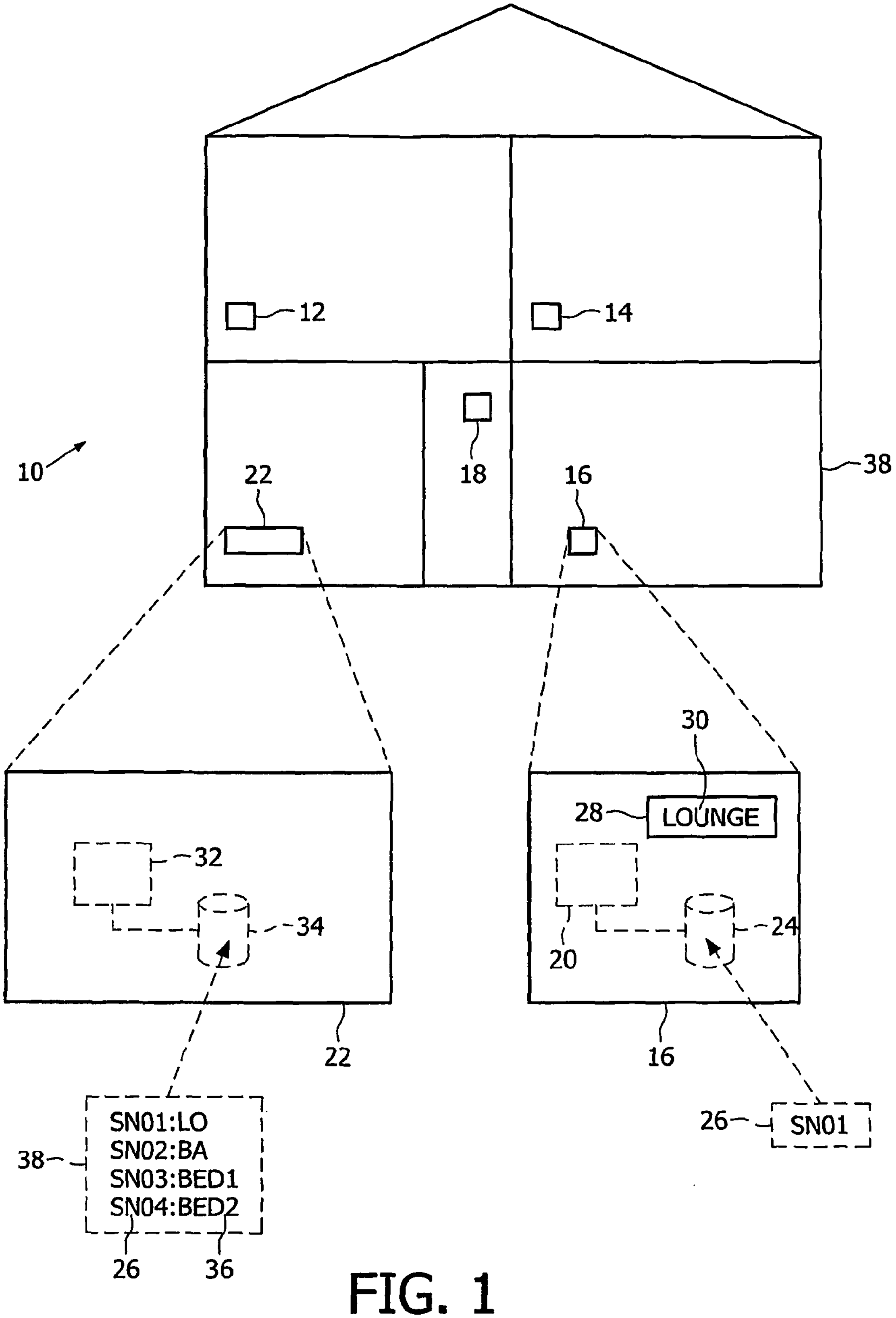

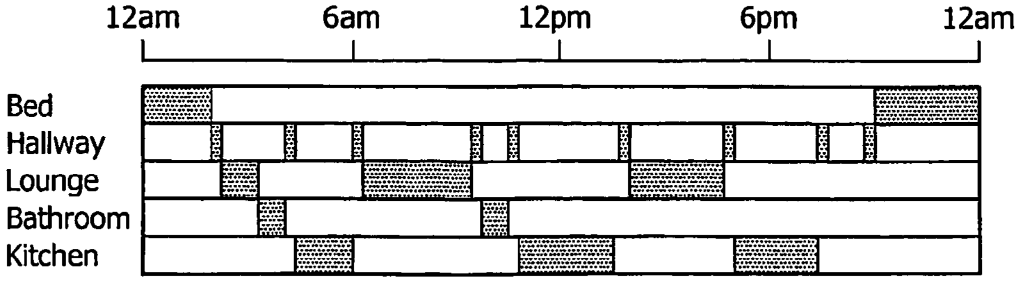
FIG. 3
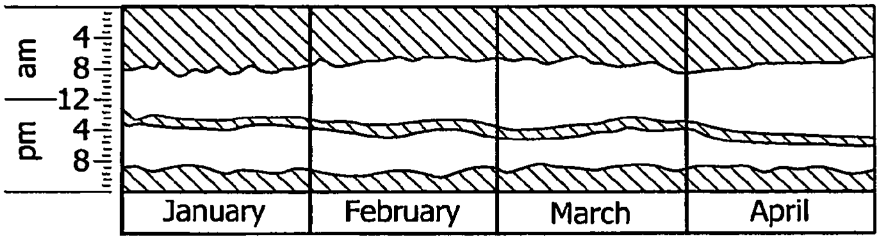
FIG. 4
Select a Summary : Kitchen Activity ▼
| | January | February | March | April |
|---|---|---|---|---|
| Average number of visits per day | 4 | 4 | 4 | 4 |
| Average duration | 30 min | 28 min | 29 min | 30 min |
FIG. 5

SYSTEM OF DEVICES COMPRISING A PLURALITY OF SENSOR DEVICES COMMUNICATING WITH A CENTRAL GATEWAY DEVICE

This invention relates to a system of devices and to a method of installing such a system of devices.

Simple social alarm devices for the disabled and elderly are ubiquitous. However, there is currently a trend for more complex systems that monitor behaviour and general welfare in addition to simple conditions, such as lack of activity on an individual movement detector or Passive Infra Red Sensor (PIR) for a given interval. Social alarms/telemonitoring systems typically consist of a residential gateway box with a number of distributed sensors.

For example, United States Patent Application Publication (US 2002/0183979 discloses an article locating and tracking system. The system for tracking an activity in a healthcare environment includes a master station having a processor, a memory, and a transceiver, badges coupled to objects, each transmitting a unique badge ID, and sensors disposed throughout the environment, each including a transceiver for receiving badge IDs and transmitting to the master station transceiver the badge IDs and a unique sensor ID that relates the sensor to a location. The master station processor determines object locations from the badge and sensor IDs by identifying the badge associated with the object, relating the sensor ID to the sensor location, and storing object location information in memory. Each badge also includes a displacement sensor that generates signals indicating object movement and direction for transmission to the sensor transceivers which forward displacement information to the master station. The master station processor uses the information to update the stored object location information.

However the system described in this Patent Application is very complex, and would require specialist installation. It is unsuitable for use in many environments, such as private homes, where the person installing the system would be a non-technical person, without great familiarity with the installation of such networks of devices.

It is therefore an object of the invention to improve upon the known art.

According to a first aspect of the present invention, there is provided a system of devices comprising a plurality of sensor devices, each sensor device comprising communicating means for communicating with a central gateway device, storage means storing a unique identifier, and display means displaying a location identifier, and a central gateway device comprising communicating means for communicating with the plurality of sensor devices.

According to a second aspect of the present invention, there is provided a method of installing a system of devices comprising receiving a plurality of sensor devices, each sensor device comprising communicating means for communicating with a central gateway device, storage means storing a unique identifier, and display means displaying a location identifier, and installing each sensor device in a location corresponding to the location identifier.

Owing to the invention, it is possible to provide a system of devices that is relatively straightforward to install, and can still function at a high level of monitoring and data gathering. Individual devices in the system are designated as being intended for installation in a particular location, and the display means that displays a location identifier for each sensor device ensures that the sensor device is correctly located.

The problem this invention addresses is twofold. Firstly it helps with installation because if sensors are hard coded with an intended location, they can be positioned by someone with no technical knowledge without using a complex and time consuming configuration phase to map location to each sensor device.

Secondly it enables the possibility of a pseudo unique identifier for each sensor. Thus in systems that use power line communication protocols such as X10, it is possible to eliminate systems elsewhere erroneously processing information from a sensor that is positioned in an unrelated building without the need for a filter, which would be difficult and expensive to install. In wireless systems the setup could be automated (device discovery) without conflicts with sensors in adjacent buildings.

Each sensor device intended to be part of the system is preferably pre-loaded with a pseudo-unique ID and a code indicating its intended location. (An alternative embodiment might be to use flash memory with location data to allow unique room locations to be specified). To allow the installer to correctly position sensors, each sensor intended to be part of a system is labelled with text indicating its location. For example text might be: “Kitchen 1”, “Kitchen 2”, “Lounge”, “Dining Room 1”, “Dining Room 2”. Hard coded on the central gateway device is a lookup table to identify each sensor according to its location code.

The invention relates to the straightforward configuration of a system with a central gateway device with a number of distributed sensors of varying kinds. Movement monitoring sensors (often PIRs) can be manufactured with location code hard coded or, for ease of manufacturing, each movement sensor can be built in an identical fashion but with a facility for a flash card with hardcoded location information to be simply installed. The user will install each sensor in the location specified by the label on the sensor, perhaps with the aid of written instructions. When a fresh network is installed in a dwelling, the system will poll each unassigned movement sensor in its range and assume it to be part of its system.

Advantageously, the central gateway device further comprises storage means storing the unique identifiers of the plurality of sensor devices, and the storage means of the central gateway device stores data corresponding to the location identifier of each sensor device and the data is linked to the unique identifier of that device. The data stored by the gateway corresponds to the location identifier and ensures that the central gateway is aware of the location of each sensor device. The gateway effectively stores a lookup table that includes all of the unique identifiers of the sensor devices and data of their location.

Ideally, the plurality of sensor devices communicate with the central gateway device via a short-range wireless communication link. The plurality of sensor devices can be arranged to communicate with the central gateway device via a wired communication link. A wireless link between the devices is easier to install, but is not always suitable for every situation. A wired network, for example via the powerline system can be used to connect the sensor devices to the central gateway device.

Preferably, the system further comprises a monitoring station in communication with the central gateway device. Ideally, the monitoring station communicates with the central gateway device via a wireless network, and the monitoring station is at a location remote from the central gateway device. The monitoring station can be used by, for example, a health care professional or a relative of a monitored individual to monitor the output of the sensors in the system to ensure that all is well with the monitored person. In the simplest embodiment, the central gateway communicates with the monitoring station via a wide area wireless network, such as a mobile phone network.

Advantageously, each of the plurality of sensor devices is arranged, in defined circumstances, to communicate its unique identifier to the central gateway device. This will typically occur when the system is first setup, and can be triggered by the system installer, or can occur automatically, when a device first powers up. This step ensures that the central gateway device is aware of those devices that are present in the system.

Preferably, at least one of the sensor devices is a movement sensor, and the storage device of the central gateway device stores the output of the sensor devices. This allows a health care professional who is visiting the monitored person to access the data from the sensor devices, as it will have been stored by the central gateway device.

Embodiments of the present invention will now be described, by way of example only, with reference to the accompanying drawings, in which:—

Figure 2:
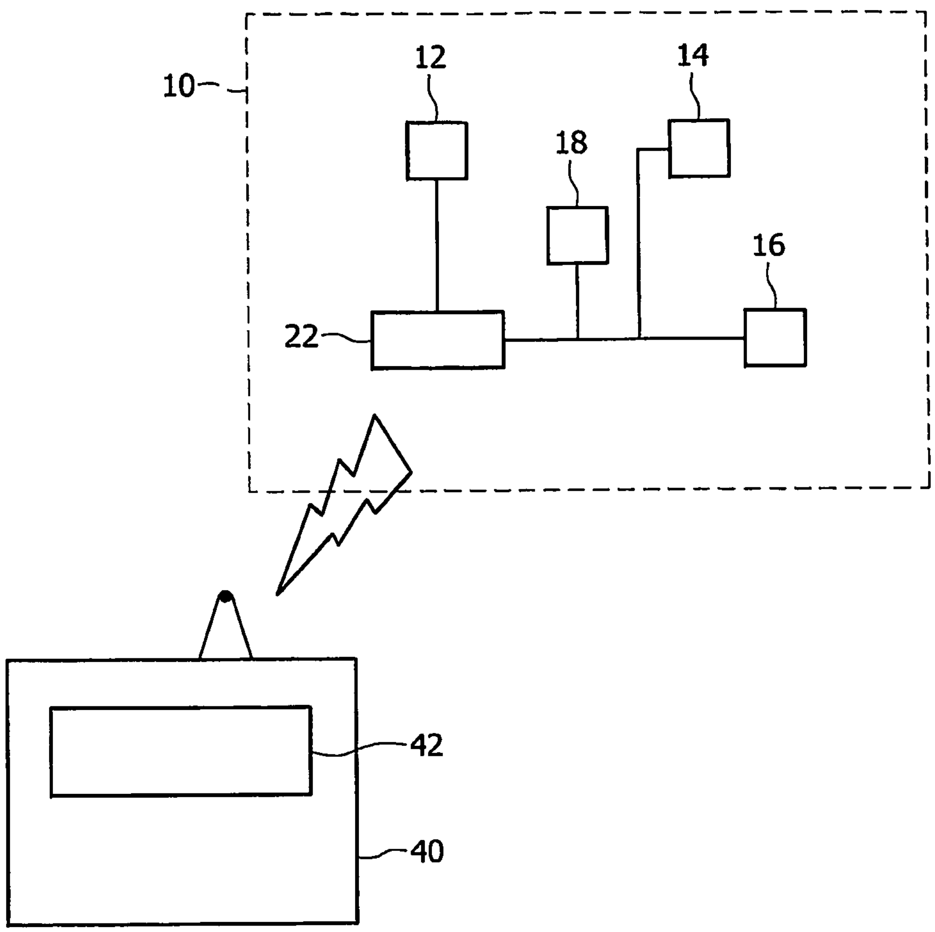
Figure 6:
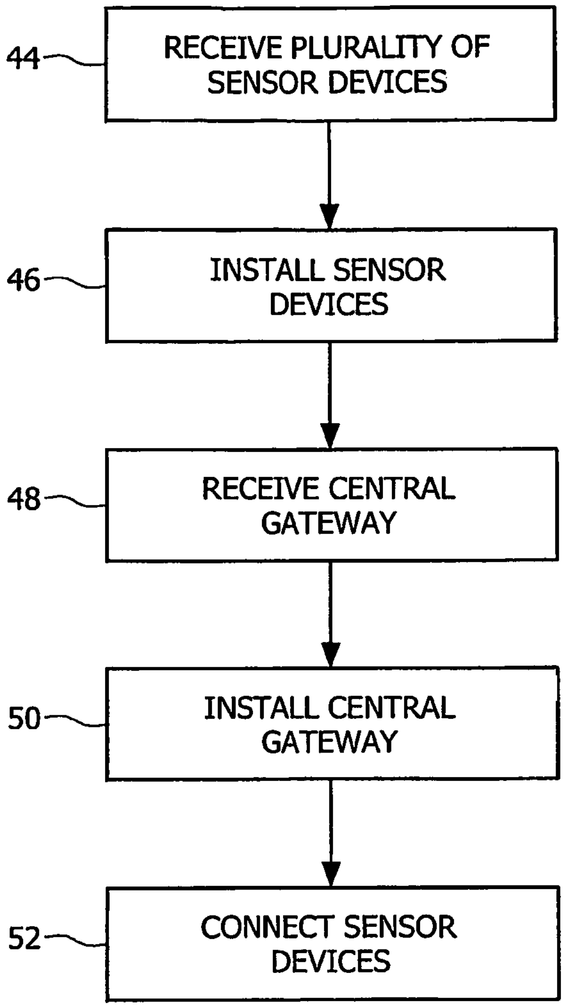

FIG. 1 is a schematic view of a system of devices, including sensor devices and a central gateway FIG. 2 is a schematic view of the system of devices of FIG. 1, with the central gateway connected to a monitoring station, FIG. 3 is a timeline of a monitored person's activity, FIG. 4 is a quarterly bed occupancy graph, FIG. 5 is a table of a summary of kitchen activity, and FIG. 6 is a flowchart of a method of installing a system of devices.

A house 10 is shown in FIG. 1, with a system of devices installed therein. The system of devices comprises a plurality of sensor devices 12, 14, 16 and 18. These sensor devices 12 to 18 form a monitoring system for a person who lives in the house 10. Some of the sensor devices are movement sensors, and others are monitoring environmental factors such as the presence of smoke.

The sensor device 16 is shown in more detail, and comprises communicating means 20 for communicating with a central gateway device 22, storage means 24 storing a unique identifier 26, and display means 28 displaying a location identifier 30. Each sensor device 12 to 18 comprises these components of communicating means, storage means and display means.

The central gateway device 22 comprises communicating means 32 for communicating with the plurality of sensor devices 12 to 18, and storage means 34 storing the unique identifiers 26 of the plurality of sensor devices 12 to 18. The storage means 34 of the central gateway device 22 also stores data 36 corresponding to the location identifier 30 of each sensor device 12 to 18 and the data 36 is linked to the unique identifier 26 of that sensor device.

The sensor device 16 has a unique identifier "SN01", meaning sensor number one in the system of devices. The display means 28, which can be a LCD screen or the like, displays the location identifier 30, which for the sensor device 16 is "LOUNGE". The information displayed by the display means 28, on each sensor device 12 to 18, is to ensure that a non-expert installer can locate each sensor device 12 to 18 correctly.

When a system of devices is prepared for installation, the unique identifiers 26 are hardcoded onto each of the storage devices 24 of each of the sensor devices 12 to 18, and corresponding entries are made on the storage device 34 of the central gateway device 22. This ensures that when the system of devices is installed in a home 10, the likelihood of an incorrect installation of the system of devices is greatly reduced.

The installer will simply look at the display device 28 of each of the sensor devices 12 to 18, and this will display the location identifier 30 for that specific device. The location identifier 30 informs the installer of the location in the house 10, in which they should install the sensor device. This is repeated for each of the sensor devices in the system. In most cases installing a device in a location requires nothing more than placing that device in that location, although for some devices in the system power and information connections may need to be made.

In the system of devices shown in the house 10 of FIG. 1, the plurality of sensor devices 12 to 18 communicate with the central gateway device 22 via a short-range wireless communication link. There are numerous short-range communication protocols that could be used, for example, Bluetooth or WiFi (IEEE 802.11b). In alternative setups of the system, the plurality of sensor devices 12 to 18 can be arranged to communicate with the central gateway device 22 via a wired communication link, such as using the powerline network integral in all modern buildings.

When the system is installed for the first time, each of the plurality of sensor devices 12 to 18 is arranged, in defined circumstances, to communicate its unique identifier 26 to the central gateway device 22. The defined circumstances will depend on the type of protocol used for the communication between the sensor devices 12 to 18 and the central gateway device 22. In one possible scenario, the central gateway device 22, once it has been installed, will issue an enquiry signal to ascertain which devices are present and installed in the system. In reply, each sensor device 12 to 18 will communicate their unique identifier 26 to the central gateway device 22. The central gateway device 22 is thus able to receive confirmation of those sensor devices 12 to 18 that are installed in the system.

The central gateway stores a lookup table 38 that contains a list of the unique identifiers 26 of the sensor device 12 to 18. This table is hardcoded when the system of devices is being prepared prior to being received by the non-expert installer of the system. The lookup table 38 also includes data 36 that corresponds to the location identifiers 30 of the devices 12 to 18. The data 36 stored by the central gateway device 22 need not be the same as the location identifier 30 displayed by the display device 28 of the sensor device 16, but must correspond to it.

In the example of the sensor device 16, the display means 28 displays the location identifier 20 "LOUNGE", while the lookup table stores the corresponding data 36 "LO" for that sensor device 16 "SN01". In practice, the lookup table 38 is likely to store a number that corresponds to the location of the sensor device 16. For each of the sensor devices 12 to 18, the lookup table 38 has a data entry 36 corresponding to the location identifier 30 for each specific sensor device 12 to 18. A more complicated lookup table is shown below, which includes more detailed information.

| Location ID | Pseudo Unique ID | Physical Sensor Location | Sensor Type |
|---|---|---|---|
| 0x001 | 0xaf32000000000000 | Kitchen 1 | PIR |
| 0x002 | 0x000000000000aa21 | Kitchen 2 | PIR |
| 0x003 | 0x000000000000aa44 | Kitchen - GAS | Natural Gas sensor |
| 0x004 | 0x00000000ffffe030 | Kitchen - SMOKE | Smoke Sensor |
| 0x005 | 0x0000ffff00000000 | Lounge | Ultrasonic |

-continued

| Location ID | Pseudo Unique ID | Physical Sensor Location | Sensor Type |
|---|---|---|---|
| . . . | . . . | . . . | . . . |
| . . . | . . . | . . . | . . . |
| 0x0f3 | 0xffff000000000000 | Dining Room 1 | Ultrasonic |
| 0x0f4 | 0x00000000ffff0000 | Dining Room 2 | PIR |
| 0x0f5 | 0x00000000ffff00e3 | Front Door Sensor | Magnetic Door status sensor |

In the system of FIG. 1, the sensor device 16 is a movement sensor, and will use an infra-red detector to detect movement in the lounge 38 of the house 10. At night time this sensor will operate as an intruder sensor, but during the day will be used to monitor the person who lives in the house 10. The sensor will detect movement of the person, and in particular will be able to detect any period of non-movement that may lead to the belief that the monitored person is in need of assistance. All data that the sensor 16 gathers is communicated, via the short-range wireless link, to the central gateway device 22.

In the vast majority of installations of such health care monitoring systems, the system will further comprise a monitoring station 40, which is in communication with the central gateway device 22. This is illustrated in FIG. 2. The monitoring station 40 will usually be located at a location that is remote from the central gateway device 22. Typically, this will be at either a local medical centre, or at the commercial premises of the supplier of the sensor devices and gateway devices that have been installed in the home 10 of the monitored person. The monitoring station 40 can be used to store the lookup table, rather than it being stored by the central gateway device 22. In this configuration, either the central gateway device 22 will call for the lookup table from the monitoring station 40, or the central gateway device will pass the output of the sensor devices 12 to 18 directly to the monitoring station 40, with the monitoring station 40 resolving the data received to its source.

In the embodiment illustrated in FIG. 2, the monitoring station 40 communicates with the central gateway device 22 via a wireless network. This can be via a mobile phone network such as the standard GSM or next generation services such as UMTS. In many systems the central gateway device 22 will communicate with the monitoring station 40 via a fixed line (wired) network, such as the standard telephone system. This has the advantage that the installation of the system of sensor devices can be piggybacked onto the standard telephone connection that is present in virtually all dwellings 10 that wish to have the system installed.

The central gateway device 22 can be configured to communicate with the monitoring station 40 in a number of different ways. In a first method, all of the readings of the sensor devices are encoded and continuously transmitted by the central gateway device 22 to the monitoring station 40. As will be appreciated, this entails very intensive use of resources such as power and bandwidth.

A second method of operating the inter communication between the central gateway device 22 and the monitoring station 40 is for the central gateway 22 to store the output of the sensor devices 12 to 18 on the storage device 34 of the central gateway device 22, and to periodically communicate with the monitoring station 40. This has the advantage of being less resource intensive than the first method, although the information that the monitoring station 40 holds in relation to the sensor devices 12 to 18 will be out of date by a maximum period of the time delay between the periods of communication from the central gateway device 22.

An alternative, third method of operating the communication of the central gateway device 22 to the monitoring station 40 is for the gateway 22 to communicate with the monitoring station 40 only in an alert situation. An alert situation can be defined broadly or narrowly, and would usually occur when the central gateway 22 interprets the output of at least one of the sensor devices 12 to 18 to indicate that the person being monitored is in need of assistance. For example, this might occur if the sensor device 14 (SN03:MAIN BEDROOM) is indicating that the person being monitored has not left this room for a period of longer than ten hours, perhaps indicating that they are ill in bed and cannot reach the telephone to call for assistance.

The monitoring station 40 is provided with a display device 42, which can be used to display the outputs of the sensor devices 12 to 18. These can be monitored by an appropriate health care professional to check on the welfare of the person being monitored. For example, the movement sensors can be used to keep check on the location within the house that the monitored person is occupying. Over time, this will lead to a profile for the monitored person of the rooms in which they are usually present at particular times and for specific durations.

The monitoring health care professional can spot any deviances from the normal pattern of the daily routine of the monitored person by looking at a graph of the outputs of the movement sensors as they vary from day to day. The monitoring station 40 may also use software to perform this analysis of the movement patterns of the monitored person. This can detect changes in pattern, and bring to the attention of a professional any monitored person for whom a change in movement pattern is a cause for concern.

This graphical display of the output of the sensor devices can be run on a set top box and viewed on a television in the dwelling 10 or run on a PC in the dwelling or by remote PC's on external servers. In practice the most likely and most useful embodiment is that information will be stored on an external server and viewed from remote PCs by professional carers or relatives.

The data gathered and made available to relatives or carers would include but not be limited to: bed occupancy, chair occupancy, movement and/or presence in a number of rooms, ambient temperature & any physiological information such as heart rate or personal temperature.

Data can be stored over a long time period for example, five or more years. A number of different views would then allow this data to be interpreted over a number of time periods. For example declines and changes in behaviour could be observed in the long, short and medium term.

The method of presenting daily movement data for the purposes of study by a healthcare professional is the timeline arrangement, as shown in the example in FIG. 3. In this embodiment the activity in rooms that might include hallway, kitchen bathroom, and lounge is displayed to the professional in addition to bed occupancy information. Feedback from other sensors such as chair occupancy sensors could also be displayed in this format.

As FIG. 3 indicates, a carer or relative can look at this graphically displayed information and make deductions. For example time spent in bed can be seen and the indicated three visits to the kitchen suggest that the occupant of the dwelling is eating regularly.

FIGS. 4 and 5 give examples of how quarterly movement information can be displayed. In the bed occupancy example it can be seen that the person in the dwelling rises around eight am and tends to go to bed around 9 with a snooze in the middle of the day. Using the quarterly feedback diagram a carer could note this pattern and spot long term changes in it.

FIG. 5 demonstrates a quarterly activity summary for a room, in this case the kitchen. It can be seen that the use of the kitchen has remained constant. Again a carer can draw conclusions from this information. Access to activity information is useful to a carer. For example confusion over the time of day is a symptom of the early onset of dementia and this could be easily identified by this kind of interface.

FIG. 6 summarises the method of installing the sensor devices 12 to 18 and the central gateway 22 in the dwelling 10 of FIG. 1. The method comprises receiving 44 a plurality of sensor devices, each sensor device comprising communicating means for communicating with the central gateway device, storage means storing the unique identifier, and display means displaying the location identifier, and installing 46 each sensor device in a location corresponding to the location identifier.

The method further comprises receiving 48 the central gateway device comprising communicating means for communicating with the plurality of sensor devices, and storage means storing the unique identifiers of the plurality of sensor devices, installing 50 the central gateway device, and connecting 52 the plurality of sensor devices to the central gateway device via a short-range wireless communication link.

The invention claimed is:

1. A method of installing a system of devices comprising receiving a plurality of sensor devices, each sensor device comprising communicating means for communicating with a central gateway device, storage means storing a unique identifier, and display means displaying a location identifier, and installing each sensor device in a location corresponding to the location identifier, wherein the data corresponding to the location identifier of each sensor device is hardcoded on the central gateway device prior to installation of the system.

2. A method according claim 1, and further comprising receiving a central gateway device comprising communicating means for communicating with the plurality of sensor devices, and storage means storing the unique identifiers of the plurality of sensor devices, and installing the central gateway device.

3. A method according to claim 1, and further comprising connecting the plurality of sensor devices to the central gateway device via a short-range wireless communication link.

4. A method according to claim 1, and further comprising connecting the plurality of sensor devices to the central gateway device via a wired communication link.

* * * * *